Patented Jan. 9, 1940

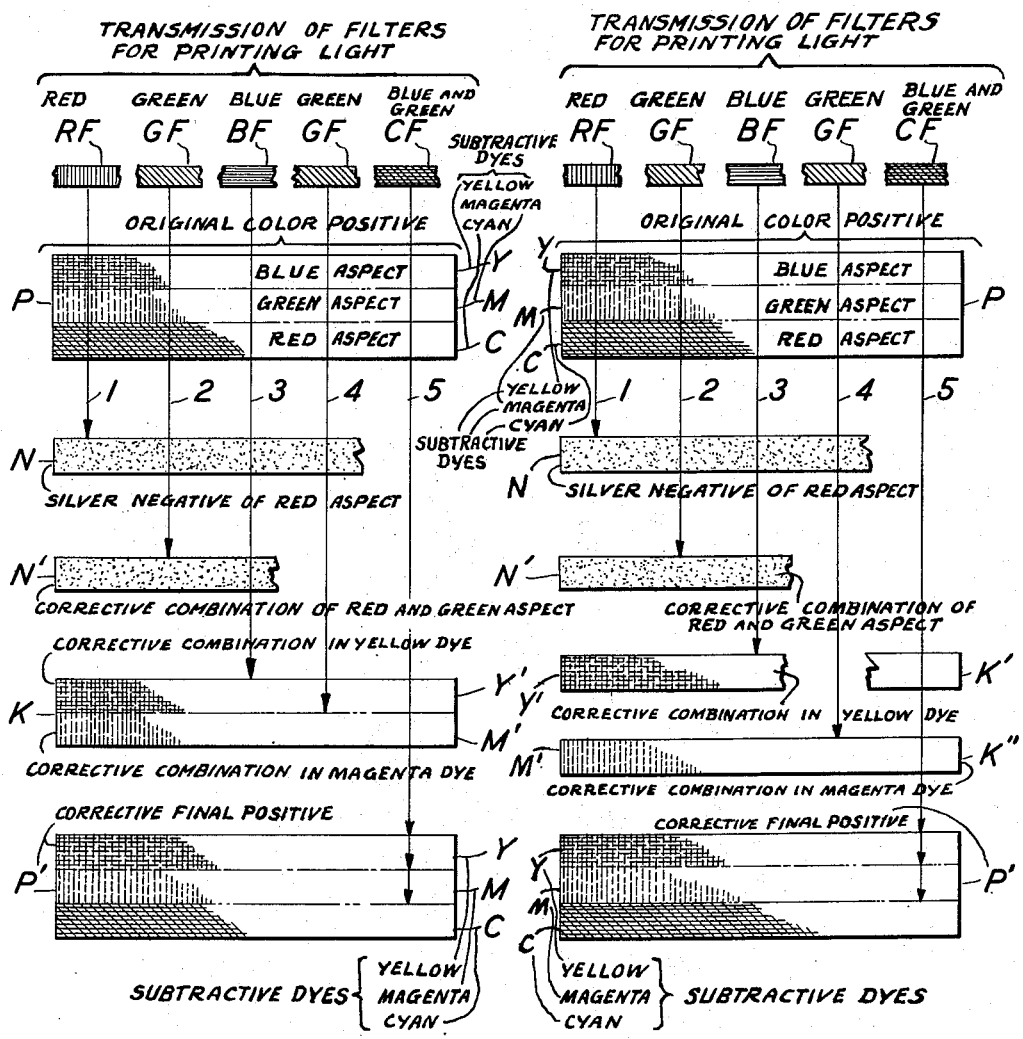

2,186,053

UNITED STATES PATENT OFFICE 2,186,053

COLOR PHOTOGRAPHY

Eastman A. Weaver, Winchester, Mass., assignor to Comstock & Westcott, Inc., Cambridge, Mass., a corporation of Massachusetts Application March 21, 1936, Serial No. 70,048

7 Claims. (Cl. 95—2)

This invention relates to color photography and more particularly to color photography of the subtractive type involving the use of a subtractive film which records the different color aspects of the scene throughout the same area, although in certain aspects the invention may be utilized with other types of film. Examples of film of the type to which this invention is particularly applicable are known as screen-plate film, monopack film, etc. In the latter type, for example, the film may comprise a transparent base carrying on one side thereof a plurality of coatings differently sensitized to record different color aspects of a scene. Usually three such coatings are provided, first a red-sensitized layer, secondly a superposed green-sensitized layer, and thirdly an ordinary blue-sensitive layer. Intermediate non-sensitized coatings may be provided to serve as filters or separators or both. By a single exposure in an ordinary camera latent negatives of three-color aspects are formed in the three layers respectively, leaving sufficient unexposed silver halide in each layer to form a corresponding positive by reversal. The layers are then subjected to suitable development to convert the exposed silver halide into silver, after which the silver is dissolved or bleached out. By reexposing the film, said unexposed silver halide is exposed to form latent positives, and then, by suitable developing treatments, the latent positives are converted into colored positives, for example as described in the Troland Reissue Patent No. 18,680, Capstaff No. 1,954,346 and in various other so-called monopack patents to Mannes and Godowsky, Gaspar and others.

To make accurate subtractive three-color photographs without retouching, each of the three coloring-matters constituting the photograph should absorb only one-third of the spectrum without appreciable absorption of the remaining two-thirds. For example, an ideal cyan (minus red) would absorb red light but neither green nor blue, an ideal magenta (minus green) would absorb green light but neither red nor blue, and an ideal yellow (minus blue) would absorb blue light but neither red nor green. However, the available coloring-matters do not in general meet these ideal requirements. While there are yellow dyes which absorb little if any light other than blue, the best available magenta color absorbs considerable blue light as well as green and the best available cyan absorbs both green and blue light as well as red. Indeed I have found that one of the best non-fugitive cyan coloring-matters for absorbing red light has approximately 50% as much absorption of green light and approximately 25% as much absorption of blue light; and one of the best non-fugitive magentas for absorbing green light has approximately 50% as much absorption of blue light. Thus the best available cyan coloring-matter may be regarded as a mixture of ideal cyan and 50% as much ideal magenta and 25% as much ideal yellow, and the best available magenta as including 50% as much ideal yellow.

These imperfections alter the proportions in which the three colors must be used in order to obtain neutral balance, that is colorless whites, grays and blacks. For example if the cyan acts as though it contained 50% ideal magenta, the theoretical amount of magenta has to be reduced 50%; and if each of the cyan and magenta pigments contributes 25% of the necessary yellow effect the theoretical amount of yellow must also be reduced 50%. While this adjustment produces neutral balance in the whites, grays, and blacks of the picture, the colored portions, especially the green portions, are dull.

This effect is not ruinously great in a direct color picture of a scene, but if one attempts to reproduce such a photograph directly by printing on similar film, the combined effect of the two sets of imperfections causes a two-fold color degradation which has heretofore rendered impractical such reproduction of color photographs.

The principal object of the present invention is to correct for the inaccuracies of available coloring-matters and to counteract the aforesaid dulling effect on the colored portions of the picture, when color prints are to be made from an original color photograph. Other objects will appear from the following description and the appended claims.

Inasmuch as the method herein disclosed and claimed is in the nature of an improvement on that disclosed and claimed in my copending application Serial No. 35,323 filed August 8, 1935, reference is made to that application as a background for the present disclosure. Further objects of the present invention are to reduce the number of steps described in the aforesaid application and to increase the sharpness of definition in the corrected color photograph.

As in my prior method the present invention involves the formation of intermediary and corrective films for use in making the corrected color print, but this improved method involves an essential departure from the former procedure. Instead of printing the corrected picture from intermediary records made from other intermediaries in two or more successive printings, I print it directly from the original color picture in connection with a superposed corrective record which furnishes the desired color correction without interfering substantially with the "drawing" of the picture. Said drawing, being applied directly from the original to the print in a single printing, carries the full sharpness of the original, avoiding cumulative loss of definition due to successive printings.

Said corrective may either be made of a single film capable, like monopack film, of recording more than one color component, or a separate film for each color component. In the latter case the films preferably carry the photographic images or records in the form of dyed reliefs. I make the corrective film or films from the original film and two intermediary negatives made on panchromatic stock, the first printed from the original with a red filter and developed to a gamma of unity, and the second printed from the first and the original in combination with a green filter. These films, in combination with the original, are then printed with color filters on the corrective film or films in two printings, and the latter are processed appropriately to develop the color images. The final print is then made in one printing from the original and corrective film or films. It will be understood that, in this context, the term "negative" means "of opposite sign" so that the intermediary negative of an original film negative (as for example an unreversed film of the Kodachrone type) would actually be a positive of the object field.

As explained in my prior application it is sometimes desirable to obtain double or triple correction. In fact, since this process is particularly adapted for making corrected color prints from original color photographs, there are usually at least two sets of coloring-matters involved for which a double correction will thus be needed to reproduce the original scene rather than the original color photograph. The degree of correction needed depends, not only on the number of pigment sets involved, but also on the degree of imperfection of their spectral absorption and on the photographic system used; e. g., a subtractive original will ordinarily require more and different corrections from an additive or screen-plate original.

I obtain various degrees of correction by varying the nature of the films on which the correctives are made, or the processing to which they are subjected, the degree of correction being in general proportional to the contrast or gamma of the corrective emulsions as processed. For instance, when dyed-reliefs are used as correctives, the degrees of correction is proportional to the density of dye put into the reliefs, and may be varied accordingly by washing and redyeing them. For double correction, i. e., to make the color print reproduce the original scene when using pigments having absorptions as hereinbefore given, the gamma of the corrective film should be three, in both the magenta and yellow components. For a single correction, with the same colors, it should be unity. In both these cases, for the same pigments, the gamma of the second negative should be approximately two.

Each printing operation should be sufficient to bring the entire printed image within the straight-line portion of the characteristic curve; and the aforesaid first negative should be developed to a gamma of approximately one as noted. The various prints may be made by contact or projection printing; but since each operation except the first involves printing a picture through more than one film, as in printing the corrective films through both the original and one or two negatives and in printing the corrected picture through the original and one or fore corrective prints, projection printing affords better definition in the printed picture except in the case of the first printing.

For the purpose of illustration typical applications of the invention are shown diagrammatically in the accompanying drawing in which:

Fig. 1 illustrates the complete procedure using a single corrective film on multicolor film stock such as monopack; and Fig. 2 illustrates the complete procedure, using two corrective films in the form of dyed-reliefs.

In each of the figures the three-color transparency such as a monopack for example, is indicated by yellow shading Y, magenta shading M and cyan shading C. The original color picture to be reproduced is designated P, the intermediary negatives as N and N', the unitary corrective print as K, the two dyed-relief corrective prints K' and K", and the corrected reproduction as P'.

Referring to Fig. 1, the first operation is to print the panchromatic film N from the original picture P, through a red filter RF, as indicated by the arrow 1, and develop it in the ordinary way to a gamma of unity. This print is registered with the original P in a projection printer, and as indicated by arrow 2 the "sandwich" is printed through a green filter on panchromatic film N' which is then developed. Thus the record in film N is a negative of the cyan record of P (the red aspect of the scene); and the record in film N' is a cross between a negative of the magenta record of P (the green aspect of the scene) and a positive of the cyan record of P (the red aspect of the scene).

N and N' are then registered with the original picture P and printed with a blue filter BF on color-recording film such as monopack, which is to form the corrective film K, as indicated by the arrow 3. The negative N is registered with P and printed with a green filter GF, as indicated by the arrow 4, on the same corrective film K, which is then processed to develop the color records, as positives, preferably by reversal, the blue-filter printing appearing as a yellow record Y' and the green-filter printing as a magenta record M'.

The gammas or relative contrasts of these color records must in general be greater than those of the commercial monopack film known as Kodachrome. For obtaining correct reproduction of the original scene on the final print, in the case where the pigments of both the initial and the final color pictures are approximately those hereinbefore specified, said gammas should be approximately three. For merely duplicating the original color picture without further color degradation in printing, said gammas should for the same pigments be approximately unity. Intermediate gammas give intermediate degrees of correction. The gamma of the negative N' should be approximately two for these cases; it may be varied to adjust the degree of correction of the yellow record only.

The corrective film K being now prepared, it only remains to register it with the original C and print with a cyan (blue-green) filter CF (of suitable comparatively thin density merely absorbing enough red rays to offset the magenta and yellow records in K and give correct color balance) on ordinary monopack film (suitable for taking original pictures), as indicated by the arrow 5, to print the corrected reproduction P' which is processed in appropriate known manner.

To avoid having to obtain or prepare and process the special high-contrast monopack film suitable for making the unitary corrective K, I may use instead two monochrome corrective films of simpler type which may preferably be dyed-relief films, made by reversal or the like process to produce positive color records. The process is shown in Fig. 2. The one receiving the blue printing is dyed yellow and the one having the green printing is dyed magenta. The gammas are as specified for the monopack corrective, and may be governed by the depth of dyeing applied to the reliefs. The two must both be registered with the original in a projection-printer for making the final corrected print. Apart from this, the process is identical with that already outlined, as will be apparent from Fig. 2.

The fact that the corrective film or films carry little of the drawing of the picture will be evident from a brief consideration of the special case of a neutral or colorless scene where the corrective film has no contrasts or density differences at all. In a neutral color picture the densities to red, green and blue light are all equal. When N is printed and developed to a gamma of unity, it becomes a negative of the red-absorbing image in P, so that when it is registered with P, all variations of the cyan or red-absorbing image are neutralized, resulting in a uniform density for red light and, the color densities being equal and the silver of the negative being neutral in color, this is true for green and blue light as well; and since N' is printed through the uniform densities of the combination of P and N, it also has a uniform density. Then the printings through P and N (arrow 4) and through P, N and N' (arrow 3) all carry uniform light exposures to the film K and produce uniform densities, with no outlines or "drawing" whatever. Thus it is evident that density differences on K (also on N') do not represent differences of light and shade in the picture, which vary widely, but only color differences, which are much less extreme for all but the most brilliant colors. Therefore the corrective has little effect on the sharpness of outline in any ordinary picture.

From the foregoing it will be evident that the increased contrasts in the corrective films K, K' and K'' have no effect on the dark-light contrast of the picture but merely increase the color contrast, offsetting the graying-down ordinarily associated with reproduction. Neither do the films K, K' and K'' appreciably affect definition. Since most color pictures, especially those composed with a high degree of artistry, consist largely of pastel shades and nearly neutral colors (flesh-pink being nearly a neutral color in this sense) it will be evident that definition in the corrected reproduction depends mainly on the original film alone.

It should be understood that the present disclosure is for the purpose of illustration only and that this invention includes all modifications and equivalents which fall within the scope of the appended claims.

I claim:

1. The method of reproducing a color picture by superimposing records of several color aspects, involving deficient coloring matter properly absorbing light transmitted by the taking filter of its color aspect but improperly absorbing light which should only be absorbed by coloring matter for a second aspect, which method comprises making a photographic record of said first color aspect of the picture, said record and said first aspect being of opposite sign, printing from said first record in register with said color picture a colored corrective record combined from said record and said second aspect, and then printing a corrected picture with said color picture and said corrective record in registered combination.

2. The method of reproducing a color picture by superimposing records of several color aspects, involving deficient coloring matter properly absorbing light transmitted by the taking filter of its color aspect but improperly absorbing light which should only be absorbed by coloring matter for a second aspect, which method comprises making a negative record of said first color aspect of the picture, with light of the taking color of said first aspect, printing from said negative record, in registered combination with said color picture, a colored corrective record with printing light of the color of said second aspect, and then printing a corrected picture with said color picture and said corrective record in registered combination.

3. The method of reproducing a color original by superimposing records of several color aspects, involving deficient coloring matter properly absorbing light transmitted by the taking filter of its color aspect but improperly absorbing light which should only be absorbed by coloring matter for a second aspect, which method comprises making an uncolored negative record of said first color aspect of the original, printing from said negative record in registered combination with said original a colored corrective record combined from said negative record and said second aspect, and printing color corrected reproductions from said original and said colored record in registered combination.

4. The method of reproducing a color picture by superimposing records of several color aspects, involving deficient coloring matter properly absorbing light transmitted by the taking filter of its color aspect but improperly absorbing light which should only be absorbed by coloring matters for a second aspect and a third aspect, respectively, which method comprises making a negative record of said first color aspect of the picture, making an uncolored corrective record of the picture by printing said second color aspect in register with said negative record, printing from said negative and said corrective records in register with said color picture a colored corrective record combined from said negative and uncolored records and said third aspect, and then printing a corrected picture with said color picture and said corrective record in registered combination.

5. The method of reproducing a color picture by superimposing records of several color aspects, involving deficient coloring matter properly absorbing light transmitted by the taking filter of its color aspect but improperly absorbing light which should only be absorbed by coloring matters for a second aspect and a third aspect, respectively, which method comprises making a negative record of said first color aspect of the picture by developing it to a gamma of unity, making an uncolored corrective record of the picture by printing said second color aspect in register with said negative record and developing it to a gamma higher than unity, printing from said negative and said corrective records in register with said color picture a colored corrective record combined from said negative and uncolored records and said third aspect, and then printing a corrected picture with said color picture and said corrective record in registered combination.

6. The method of reproducing a color picture by superimposing records of the red, green and blue color aspects, involving deficient coloring matter properly absorbing red light but improperly absorbing green light, which method comprises printing a negative record from the picture with red light, printing from said record in registered combination with said pcture, a correctve green absorbing record with green light, and then printing a corrected picture from said color picture and said corrective record in registered combination.

7. The method of reproducing a color picture by superimposing records of the red, green and blue color aspects, involving deficient coloring matter properly absorbing red light but improperly absorbing green light, which method comprises printing a negative record from the picture with red light, printing from said record in registered combination with said picture, a corrective green absorbing record with green light, and then printing with blue-green light a corrected picture from said color picture and said corrective record in registered combination.

EASTMAN A. WEAVER.